Dec. 1, 1942.   H. OSWALD   2,303,951
INTERNAL COMBUSTION ENGINE PLANT
Original Filed Sept. 9, 1940    2 Sheets—Sheet 1
Fig. 1,
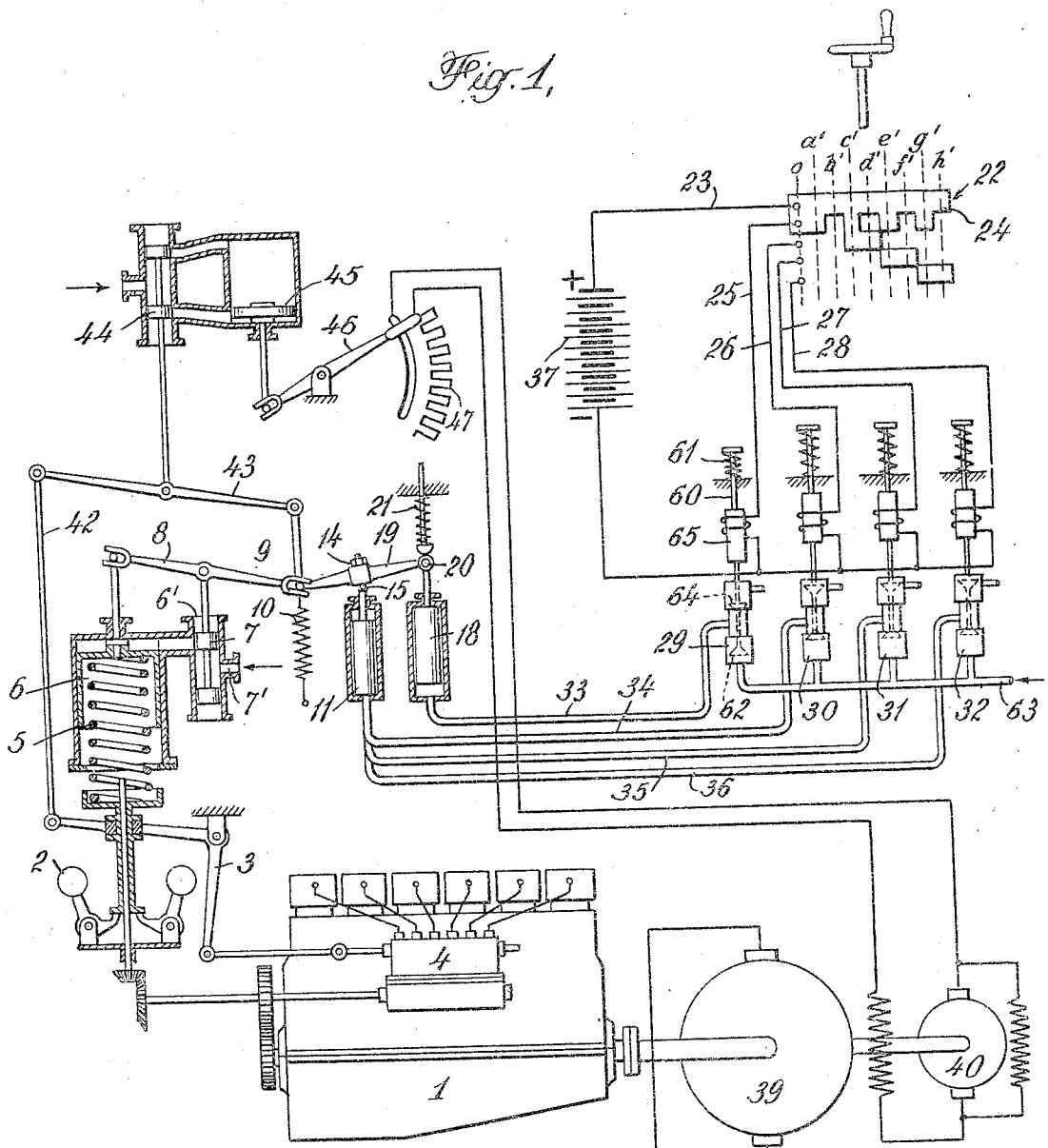
Fig. 2,
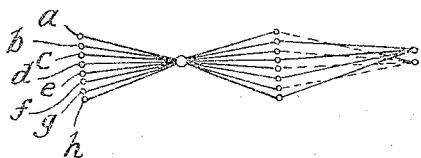
INVENTOR
Hans Oswald
BY
Pennie, Davis, Marvin & Edmonds
ATTORNEYS Dec. 1, 1942.   H. OSWALD   2,303,951
INTERNAL COMBUSTION ENGINE PLANT
Original Filed Sept. 9, 1940   2 Sheets-Sheet 2
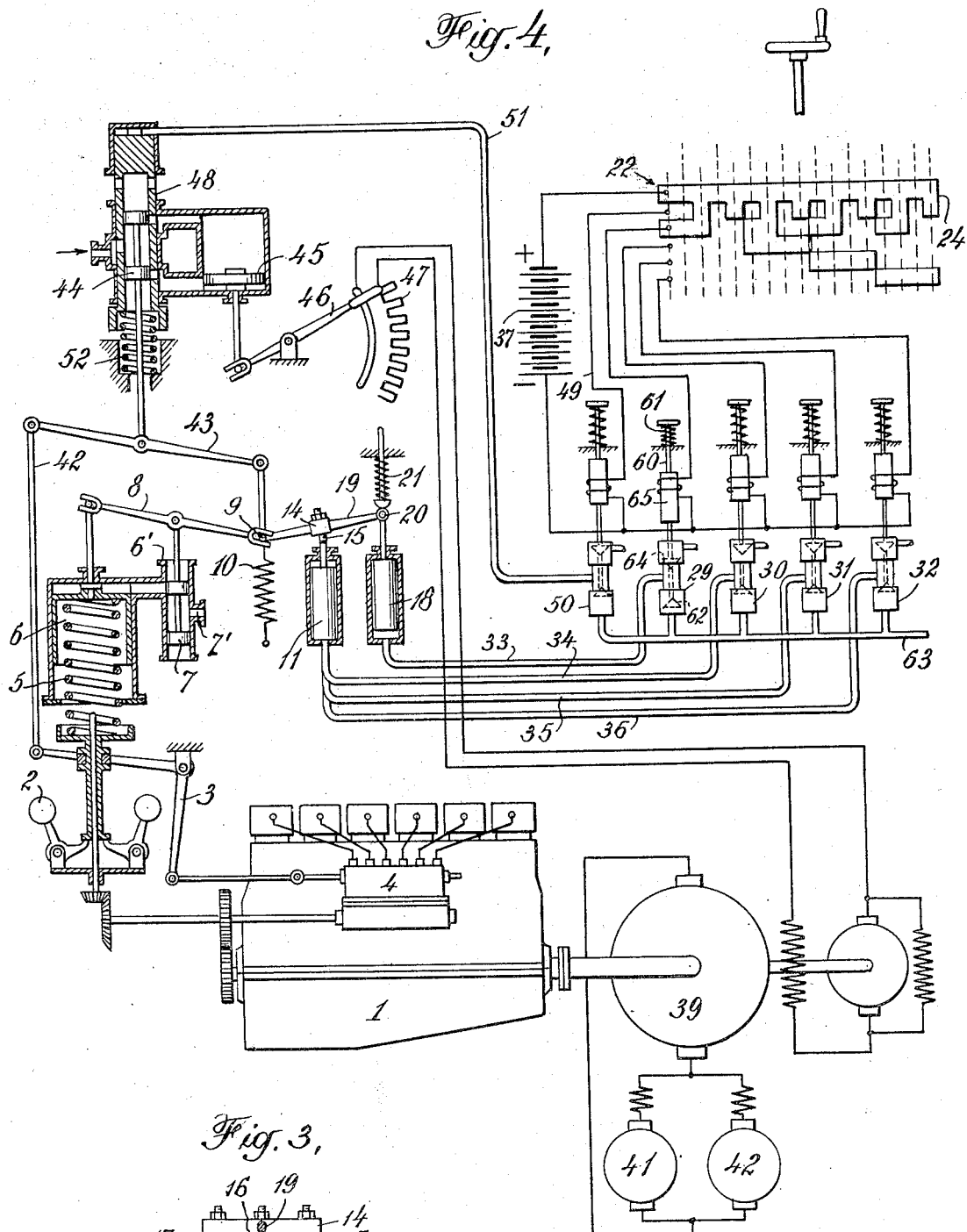
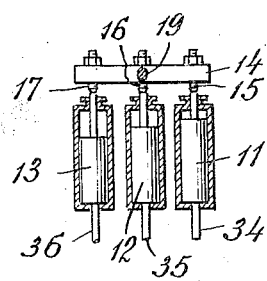
INVENTOR
Hans Oswald
BY
Pennie, Davis, Marvin & Edmonds
ATTORNEYS Patented Dec. 1, 1942

2,303,951

UNITED STATES PATENT OFFICE 2,303,951

INTERNAL COMBUSTION ENGINE PLANT

Hans Oswald, Winterthur, Switzerland, assignor to Sulzer Frères Société Anonyme, Winterthur, Switzerland Original application September 9, 1940, Serial No. 355,944. Divided and this application October 3, 1941, Serial No. 413,434

4 Claims. (Cl. 290—17)

This invention relates to a power plant for vehicles and the like in which an internal combustion engine drives an electrical generator having a variable load control means and has for its object the provision of a control system for varying the supply of fuel to the engine and the load on the generator simultaneously and in steps. More particularly, the invention aims to provide a control system having a plurality of separate step positions, each of which may be set at one or more additional step positions by a single adjustment member.

This invention comprises a plurality of adjustment elements, for example electrically operated valves, one of which is an intermediate adjustment element, each operated by a controller, an adjustment member operated by each of the adjustment elements, one of which is an intermediate adjustment member operated by the intermediate adjustment element, and fuel and load control means operatively connected to the adjustment members, whereby any one of the adjustment members operated by an adjustment element may set the fuel and load control means at a different main step position and the intermediate adjustment member can set the fuel and load control means at an intermediate step position between two main step positions. The fuel and load control means is preferably influenced by a speed governor driven by the engine, and a coupling system, for example a linkage, is provided interconnecting the governor, the fuel and load control means, and the adjustment members by means of which the fuel and the load can be varied simultaneously in accordance with engine speed for each step position set by the adjustment members. The controller is preferably in the form of a multi-contact switch and each adjustment element is connected through an electric circuit to the controller.

In a more or less complete arrangement of apparatus according to the invention, a servomotor is connected to the coupling system for simultaneously controlling the supply of fuel and the load for each step position under the influence of the speed governor and an additional intermediate adjustment member may be provided under the control of an additional intermediate adjustment element for the purpose of doubling the number of step positions.

This application is a division of my copending application Serial No. 355,944, filed September 9, 1940.

In the accompanying drawings which illustrate more or less diagrammatically apparatus embodying the invention, Fig. 1 shows apparatus for regulating an internal combustion engine for four main speeds, four intermediate speeds, and an arrangement of apparatus for regulation of the torque in addition to regulation of the speed;

Fig. 2 shows the position of the speed adjusting linkage for different steps of the main controller;

Fig. 3 is a view along line 3—3 of Fig. 1; and

Fig. 4 illustrates apparatus in which a torque step is added to each different speed.

In the apparatus illustrated in Fig. 1, the internal combustion engine 1 drives a generator 39. The speed governor 2 controls the feed pump 4 through the linkage 3. By changing the tension of the spring 5, the piston 6 controlled by the valve 7 adjusts the speed, which is kept constant by the governor 2. The valve 7 controls the flow of fluid under pressure from opening 7' into the cylinder of piston 6 and also the discharge of the fluid through opening 8'. With the help of the main controller 22 the pistons 10 and 11 to 13 (Fig. 3) for controlling the speed are controlled through adjusting elements, for example the electro-pneumatic valves 29, 30, 31 and 32. The valve 29 is the intermediate adjustment element. The pistons 11, 12 and 13 are adjustment members and the piston 18 is an intermediate adjustment member. Each of these valves has a rod 60 held in an upward position by a spring 61 in which position the plug 62 closes a passage from pipe 63, which contains a fluid under pressure, through one of the pipes 33 to 36 connecting respectively with one of the pistons 18 and 11 to 13, and raises the plug 64 opening a passage to discharge the fluid from one of the pistons 18 and 11 to 13 thereby relieving the pressure on said pistons. When a circuit is made by the controller 22 through the electromagnet 65 the rod 60 is moved downward opening the said passage controlled by plug 62 and closes the passage controlled by plug 64.

In the 0 position of the main controller as shown in the drawings, only the valve 29 is excited from the battery 37 through cable 23, contact segment 24 and control wire 25. The end 20 of the lever 19 is thereby pressed into the top position. The pistons 11 to 13 are, since the valves 30 to 32 are not excited, in the bottom end position, as is also the traverse 14. The lever 19 consequently stands in such a position that its end point 9 is brought into the lowest position a (Fig. 2) by the pull of the spring 10. The final position of the valve 7 corresponds to the top position of piston 6 and the engine runs with the lowest speed $n_1$.

When the main controller 22 is turned to position $a'$ of contact segment 24, the speed does not change. This position of the main controller can serve only for switching in the load by actuating a device which is not shown.

If the main controller is rotated further to the position $b'$ of contact segment 24, excitation of the electromagnet of the valve 29 is stopped. The piston 18 is pressed down to its lowest position by the spring 21, the end 20 of the lever 19 also goes into its lowest position. Since the traverse 14 has remained in its lowest position, the other end 9 of the lever 19 moves into the position $b$ (Fig. 2), whereby the valve 7 is pulled upwards from the end position until so much control means has flowed to the piston 6 that it moves down into the position corresponding to speed $n_2$. In this way it brings the valve 7 again into the final position.

In position $c'$ of the contact segment 24 the piston 18 and the end 20 of lever 19 are again pushed upwards. But at the same time also valve 30 is excited, so that piston 11 moves upwards and the stop 15 or the traverse 14 is moved a certain distance upwards. The end point 9 of lever 19 then goes into the position $c$ (Fig. 2) and the speed is still further increased.

The position $d$ (Fig. 2) of the end point 9 of lever 19 (Fig. 1) is reached when the main controller is in position $d'$ and piston 18 and the end 20 of lever 19 again move downwards in consequence of the valve 29 being no longer excited, but the traverse 14 remains at the same position as before. At the main controller positions $e'$ and $f'$ or $g'$ and $h'$ (contact strip 24) the valves 31 or 32 respectively are excited instead of the valve 30. Since the plungers of the pistons 12 and 13 are each shorter by a certain amount, the traverse 14 with the stops 16 or 17 respectively is always pressed upwards a greater distance, so that the main speeds continuously increase. By alternately switching the valve 29 on and off, an intermediate speed can be obtained to each main speed in the manner described.

The generator 39 has an exciter 40 supplying current to the motors 41 and 41'. An output regulating device for the generator 39 is also provided consisting of a servomotor 44, 45 controlled through the linkage 42, 43 and also of the regulating resistance 46, 47. With the help of this additional device it is possible to arrange in known manner that the exciting of the generator 39 corresponds always to the current flowing through the generator, so that the load on the internal combustion engine 1 remains constant at a figure which corresponds to the position of the governor 2 at which the valve 44 is in the closed position. As long as the end point 9 of lever 19 remains in the same position, the position of the governor 2 also remains unchanged and corresponds to the closing position of the valve 44. If, however, the end point 9 of lever 19 moves downwards, which is the case as already described when the device is set for running at a higher speed, the governor 2 adjusts the fuel pump to deliver a greater quantity of fuel when the valve 44 is in the closed position. In this manner the torque is made to be dependent on the speed for which the device is set.

In Fig. 4 there is also an intermediate valve 48 provided between valve 44 and its casing; this intermediate valve is controlled from the main controller 22 through control wire 49, valve 50, pipe 51 and spring 52. The intermediate valve may be brought into two end positions. If the valve 48 is brought into another position, the piston 45 will be supplied with pressure means until the load has changed to such an extent that governor 2 brings the valve 24 again into the closed position.

In the upper position of valve 48, which corresponds to the position of valve 50 when excited, the quantity of fuel adjusted by governor 2 is less than in the lower position, which corresponds to the position of valve 50 when excited through control wire 49 and to the valve 48 supplied with control means under pressure. To each speed to which the engine can be set by the pistons 11 to 13 and 18 in the manner described, there are consequently two different torque steps arranged by means of the intermediate valve 48, so that the number of load steps is doubled in comparison with the construction according to Fig. 1.

In the drawings the speed governor 2 is shown as a direct acting governor. Naturally, however, it would be possible to adopt also a governor acting indirectly, for instance with the help of a servomotor worked with oil under pressure, or any other type of governor of known construction could be used, for instance a purely hydraulic governor.

I claim:

1. An internal combustion engine plant which comprises an engine, a variable electrical generator driven by the engine, fuel supply means for the engine, a governor driven by the engine, means operatively connecting the governor and the fuel supply means, a plurality of adjusting elements actuatable from a control position, an adjusting member arranged to be held in one of its main step positions by one of the adjusting elements, said adjusting member being operatively connected to the fuel supply means, the variable electrical generator, and the governor, and an intermediate adjusting element arranged to be actuated from the control position arranged to hold the adjusting member in an intermediate position between two main step positions.

2. A power plant which comprises an internal combustion engine, an electrical generator driven by the engine, means for varying the load on the generator, a fuel supply means for the engine, means responsive to the speed of the engine for varying the fuel supply means and the means for varying the load on the generator simultaneously, a controller at a control position, a plurality of adjustment elements each electrically connected to the controller, an intermediate adjustment element, a plurality of adjustment members each of which is operated by an adjustment element, an intermediate adjustment member operated by the intermediate adjustment element, a coupling system connecting the governor, the means for varying the load on the electrical generator, the fuel supply means and the adjustment members, said controller being arranged to actuate any adjustment element selectively and each adjustment element being arranged to actuate an adjustment member which sets the coupling system to a main step position at which the speed governor controls the supply of fuel and the load on the generator in accordance with engine speed, and said intermediate adjustment element being arranged to add an intermediate step position to the coupling system.

3. A power plant according to claim 2 which comprises a servomotor connected to the coupling system and to the means for varying the load on the generator, whereby the adjustment members may set the servomotor to vary the load on the generator, said governor being arranged to actuate the servomotor at each step position in accordance with engine speed.

4. A power plant according to claim 2 in which each adjustment element comprises a valve operated by a solenoid electrically connected to the controller and each adjustment member comprises a piston, and means under the control of each valve for actuating each piston by a fluid under pressure.

HANS OSWALD.